United States Patent
Kalapathy et al.

(10) Patent No.: US 7,502,054 B2
(45) Date of Patent: Mar. 10, 2009

(54) AUTOMATIC DETECTION OF FLUORESCENT FLICKER IN VIDEO IMAGES

(75) Inventors: Paul E. Kalapathy, Springfield, MO (US); Michael Frank, Sunnyvale, CA (US)

(73) Assignee: PIXIM, Inc., Mountain View, CA (US)

( * ) Notice: Subject to any disclaimer, the term of this patent is extended or adjusted under 35 U.S.C. 154(b) by 716 days.

(21) Appl. No.: 11/018,662

(22) Filed: Dec. 20, 2004

(65) Prior Publication Data

US 2006/0132859 A1 Jun. 22, 2006

(51) Int. Cl.
*H04N 9/73* (2006.01)
*H04N 5/222* (2006.01)
*H04N 5/228* (2006.01)

(52) U.S. Cl. .................. 348/226.1; 348/370; 348/228.1

(58) Field of Classification Search .............. 348/226.1, 348/227.1, 228.1, 229.1, 223.1, 370, 371, 348/255, 607
See application file for complete search history.

(56) References Cited

U.S. PATENT DOCUMENTS

| | | |
|---|---|---|
| 4,992,855 A | 2/1991 | Takei |
| 5,272,539 A | 12/1993 | Kondo |
| 5,293,238 A | 3/1994 | Nakano et al. |
| 5,598,000 A | 1/1997 | Popat |
| 6,091,452 A | 7/2000 | Nishiyama |
| 6,271,884 B1 | 8/2001 | Chung et al. |
| 6,710,818 B1 * | 3/2004 | Kasahara et al. ............ 348/607 |
| 6,771,838 B1 * | 8/2004 | Fan ............................. 382/274 |
| 7,164,439 B2 * | 1/2007 | Yoshida et al. ........... 348/226.1 |
| 7,289,144 B2 * | 10/2007 | Arazaki .................... 348/228.1 |
| 2004/0179114 A1* | 9/2004 | Silsby et al. ............. 348/226.1 |

* cited by examiner

*Primary Examiner*—Ngoc-Yen T Vu
*Assistant Examiner*—Carramah J Quiett
(74) *Attorney, Agent, or Firm*—Patent Law Group LLP; Carmen C. Cook

(57) ABSTRACT

A method for detecting the presence of flicker in video images includes obtaining luminance data from sampled image fields and analyzing the luminance data to obtain a digital number characterizing the brightness of the luminance data. Frequency analysis is performed on a time-series of digital numbers collected over multiple sampled image fields to provide a signal indicative of the spectral energy at a flicker frequency band and a signal indicative of the spectral energy at a non-flicker frequency band. A ratio of the two spectral energy signals is computed as the flicker detect indicator. Multiple flicker detect indicators are accumulated to generate a flicker present signal. In one embodiment, the flicker detect indicator is accumulated only when the ratio has a value greater than a first threshold and the flicker present signal is asserted only when the number of flicker detect indicator signals accumulated exceeds an entry value.

20 Claims, 4 Drawing Sheets

AUTOMATIC DETECTION OF FLUORESCENT FLICKER IN VIDEO IMAGES

FIELD OF THE INVENTION

The invention relates to fluorescent flicker detection in a video camera and, in particular, to a method for automatically detecting the presence of fluorescent flicker in a video image.

DESCRIPTION OF THE RELATED ART

Fluorescent lighting can cause objectionable flicker in video images, resulting in degradation of quality of the video images. Specifically, flicker occurs when a camera images an object under illumination of a flickering light source such as a fluorescent lamp. Fluorescent lighting has the property of responding very quickly to instantaneous changes in AC power line voltage. Thus, fluorescent light sources literally turn on and off on each half cycle of the AC power supply, resulting in periodic variation of the brightness of the fluorescent light source over time. The periodic brightness variation of a fluorescent light source is referred to as "fluorescent flicker." FIG. 1 illustrates the light intensity of a fluorescent light source plotted over time. Fluorescent lighting acts as a rectifier of an AC power supply and the brightness or intensity of the light varies periodically at twice the frequency of the AC power supply. As shown in FIG. 1, when the AC power supply is assumed to be 50 Hz, a fluorescent light will turn on and off 100 times per second, resulting in a flicker frequency of 100 Hz. For a 60 Hz AC power supply, the flicker frequency of the fluorescent light will be 120 Hz. Although fluorescent flicker at 100 Hz or 120 Hz are not noticeable to the human eye, such flickering presents various problems for video or still image cameras. For example, fluorescent flicker may affect the performance of electronic focusing systems.

Fluorescent flicker can be especially severe in cases where images are taken by an NTSC video camera while the scene is illuminated by a fluorescent light source powered by 50-Hz AC power. An example of this is in certain areas of Japan where the electrical power main frequency is 50 Hz while video cameras in the region adopt the NTSC standard which has a video refresh rate (or field rate) of 60 Hz (the NTSC refresh rate is more accurately 59.94 Hz but is often approximated as 60 Hz). When the frequency of the power main is substantially different than the refresh rate of the video images, there is a beat frequency between the camera refresh rate and the flicker frequency of the fluorescent lighting. The beat frequency between the light source and the camera often appears as visible flicker in the resulting video images. Such observable flicker in the video images greatly degrades the image quality of the video camera and often time renders the video images unacceptable to the viewer.

In the present description, the video refresh rate (or field rate) of a video camera refers to the field update rate of the video camera which is usually set by international standards. Each geographical area selects the desired standard to be adopted for that region. For the NTSC video standard, the field update rate is 60 Hz. Therefore, in a video camera operated under the NTSC standard, a new image field is updated every 1/60 second. When the camera is used to capture scenes lighted by fluorescent lighting, the camera refresh rate needs to match an integer multiple of the frequency of the AC power supply so that each image field samples the same amount of light. Specifically, when the camera refresh rate is the same as the frequency of AC main power supply, the flicker frequency, being twice the main power supply frequency, will be an integer multiple (2) of the refresh rate. Thus, each image field will capture the same number of cycles of the fluorescent light source, resulting in the same amount of light being captured at each image field. No flicker in the resulting video image will result.

However, if the video camera refresh rate has a frequency substantially different than the frequency of the AC power supply, then the flicker frequency of the fluorescent light does not have an integer multiple relationship with the refresh rate. Each captured field will end up sampling different portions of the periodic light variation cycles and therefore a different amount of light. This is illustrated in FIG. 1 where the flicker frequency is at 100 Hz while the refresh rate is at 60 Hz. As shown in FIG. 1, at each sampling field S1, S2, and S3, different amount of light is being sampled. When each image field samples different amount a light, the brightness of the resulting images will change from one field to another, resulting in observable and highly objectionably flickering in the video images.

Various methods for detecting fluorescent flickers and eliminating fluorescent flicker in video images are known. However, an accurate and reliable method for detecting the presence of fluorescent flicker in video images is desired.

SUMMARY OF THE INVENTION

According to one embodiment of the present invention, a method for detecting the presence of flicker in video images includes: obtaining a set of luminance data from each sampled image field of the video images, analyzing the set of luminance data to obtain a digital number characterizing the brightness characteristic of the set of luminance data, compiling a time-series of digital numbers over multiple sets of luminance data of multiple sampled image fields, and performing frequency analysis on the time-series of digital numbers to provide a first signal indicative of the spectral energy of the time-series of digital numbers at a flicker frequency band and a second signal indicative of the spectral energy of the time-series of digital numbers at a non-flicker frequency band. The method further includes computing a first spectral energy signal and a second spectral energy signal based on the first signal and the second signal respectively, computing a ratio of the first spectral energy signal to the second spectral energy signal where the ratio is a flicker detect indicator signal. Then, the method includes accumulating multiple flicker detect indicator signals from multiple time-series of digital numbers where the accumulated flicker detect indicator signals have values greater than a first threshold, and generating a flicker present signal when the number of accumulated flicker detect indicator signals is greater than an entry value.

The present invention is better understood upon consideration of the detailed description below and the accompanying drawings.

DETAILED DESCRIPTION OF THE PREFERRED EMBODIMENTS

In accordance with the principles of the present invention, a method for detecting the presence of fluorescent flicker in video images uses frequency analysis of an illumination characteristic of the video images over a series of exposures and comparison of spectral energy signals at a flicker frequency and a non-flicker frequency to detect the presence or absence of flicker in the video images. The flicker detection method of the present invention generates a reliable flicker indicator signal which can be used by electronics of a video camera to modify the camera operation in accordance with the flicker detection result for flicker cancellation. In one embodiment, the exposure time of the video camera is extended to eliminate the flicker in the images. The method of the present invention allows flicker detection to be performed automatically and flicker compensation can be initiated or discontinued without user intervention.

Figure 1:
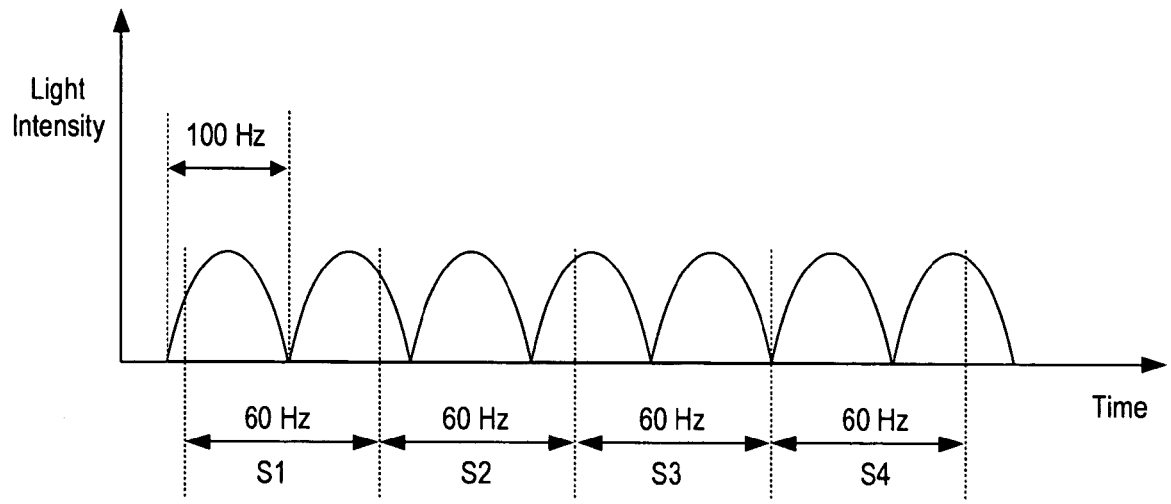
FIG. 1 illustrates the light intensity of a fluorescent light source plotted over time and the use of a 60 Hz exposure time for image capture.

In the present description, the term "fluorescent flicker" is used to refer to the flicker of an artificial light source powered by an AC power supply. Flickering of an AC powered artificial light source refers to the periodic brightness variations of the light source due to the cycling of the AC power supply. As described above with reference to FIG. 1, an artificial light source will have a flicker frequency twice the frequency of the AC power main used to power the light source. While such flickering occurs in both incandescent lighting and fluorescent lighting, the flicker of a fluorescent light source is especially problematic for video image capture. The flicker of an incandescent light source is so minimal that it is practically imperceptible and thus generally does not present a problem in video imaging. However, the flicker of a fluorescent light source can be problematic for video imaging particularly when the video imaging system uses a field rate that does not match the AC power supply of the fluorescent light source. In the present description, the flicker of an artificial light source is referred to as "fluorescent flicker" but the use of the term "fluorescent flicker" is not intended to limit the application of the method of the present invention to the detection of flicker generated by AC powered fluorescent light sources only. One of ordinary skill in the art, upon being apprised of the present invention, would appreciate the flicker detection method of the present invention can be applied for the detection of flickering in images illuminated by any AC powered artificial light source.

The flicker detection method of the present invention is particularly useful in video cameras operated under the NTSC standard with a field frequency of 60 Hz in an area where the commercial power main frequency is 50 Hz. By using automatic flicker detection, a video camera can be operated in a normal mode for optimal image quality when the scene is illuminated by a non-flickering light source, such as sun light or an incandescent light source. The video camera can be automatically placed in a flicker compensation mode when the scene is illuminated by a flickering light source and fluorescent flicker is detected in the video images. In the flicker compensation mode, the video camera can be operated using exposure control parameters that are optimized for flicker cancellation. Although video images captured in the flicker compensation mode may suffer from slight degradation in image quality and resolution, the benefit of removing the flickering in the video images far outweighs the image degradation due to the modified exposure control.

Method Overview

Figure 2:
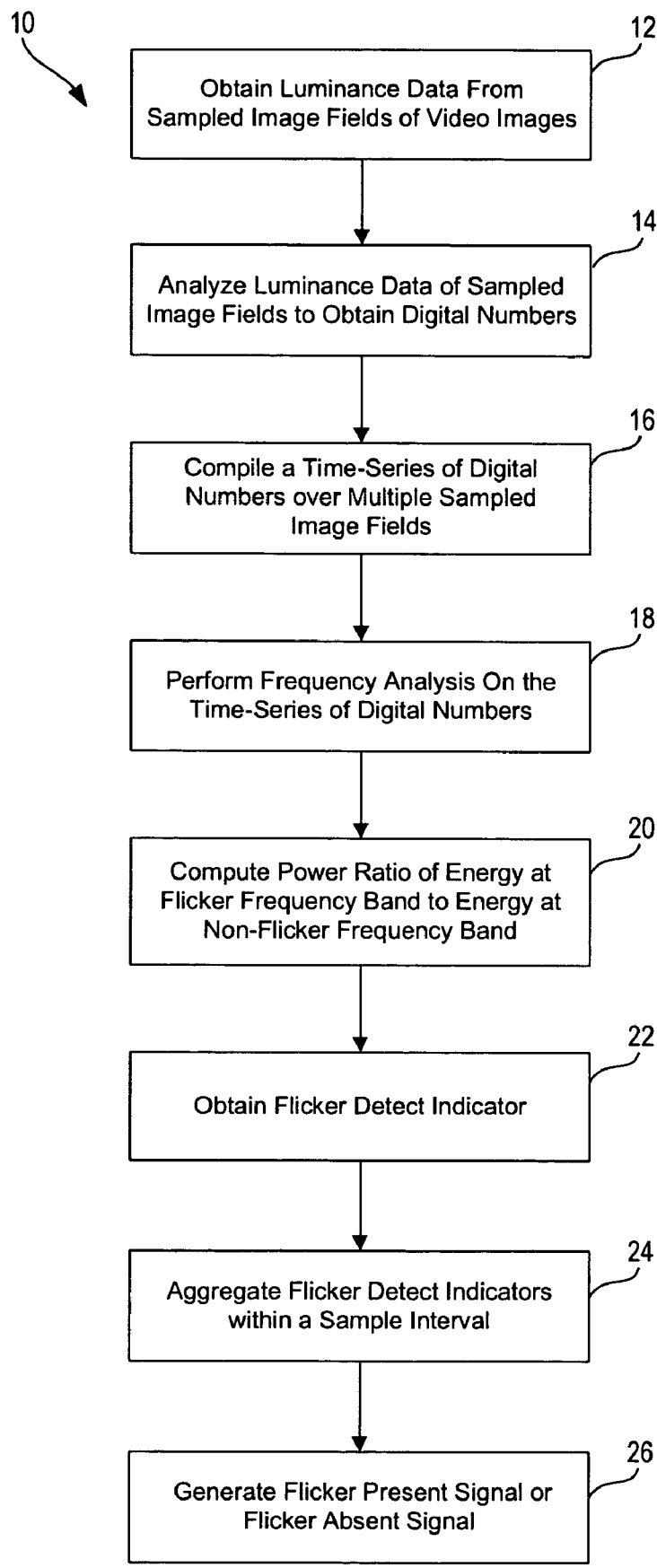
FIG. 2 is a flow chart illustrating the automatic flicker detection method according to one embodiment of the present invention.

FIG. 2 is a flow chart illustrating the flicker detection method according to one embodiment of the present invention. In the following description, it is assumed that the flicker detection method of the present invention is implemented in an NTSC video camera operating at the field rate of 60 Hz while the scene being imaged is sometimes illuminated by a flickering light source powered by a 50 Hz power supply. The difference between the camera field rate and the frequency of the AC power main causes objectionable flicker in the video images where the presence of flicker in the video images is to be detected by the method of the present invention.

Referring to FIG. 2, flicker detection method 10 starts by obtaining luminance data from the image fields of the captured video images (step 12). The luminance data can be obtained at every image field (60 Hz sample rate) or every other image field (30 Hz sample rate). Other desired sampling frequency can also be used depending on the camera system in which the method of the present invention is practiced. Furthermore, the luminance data for each sampled image field can include pixel data of the entire image or pixel data from only a region of the image.

The luminance data from each sampled image field are analyzed to obtain a digital number characterizing the intensity values of the luminance data (step 14). In one embodiment, the luminance data are applied to a histogram engine where a histogram of the intensity values of the luminance data is obtained. From the histogram, the luminance data is characterized by a digital number (DN). In the present embodiment, the luminance data in the histogram is characterized by the median luminance value as the digital number. That is, the digital number is selected to be the luminance value of the sampled image field where 50% of the luminance values are below and 50% of the luminance values are above the digital number. In other embodiments, other luminance characteristics of the histogram can be used, such as the 25 or 75 or any other percentile of the luminance values. The exact characteristic of the histogram to be used as the digital number is not critical to the practice of the method of the present invention. In the following description, the digital number (DN) will be referred to as the median luminance value of a sampled image field. It is instructive to note that the use of the median luminance value is illustrative only and is not intended to be limiting.

More specifically, the digital number is selected to characterize the brightness variations of the sequence of video images being captured to detect brightness variations caused by a flickering light source. It is presumed that if a scene is illuminated by a flickering light source, the brightness level of each successive image field will vary rapidly and there will be a measurable variation in the median brightness value (or other percentile brightness value) over time. In the normal course of video capture, the brightness of a scene is expected to vary. However, if the brightness variation is caused by a flickering light source, the brightness variation will have a frequency spectrum such as that shown in FIG. 4 and described in more detail below. Therefore, by analyzing the frequency spectrum of a series of digital numbers characterizing the brightness level of the video images, the presence of flicker caused by a flickering light source can be detected.

In method 10, a time-series of digital numbers is compiled from a sequence of sampled image fields (step 16) and frequency analysis is performed on the time-series of digital numbers (step 18). Each time-series of digital numbers includes a sufficient number of digital numbers for a meaningful frequency analysis. In one embodiment, the sample size of digital numbers used is equal to the number of taps in the digital filters used to perform the frequency analysis. For instance, a sample size of 32 digital numbers can be used. In one embodiment, the frequency analysis process is a continuous process. Once there are enough digital number samples to fill all the taps of the digital filters, frequency analysis is performed for each input sample (i.e. each new digital number) thereafter.

In the present embodiment, the multiple time-series of digital numbers are derived from partially overlapping sequences of sampled image fields where each new digital number received is used to form a new time-series of digital numbers. In other embodiments, the multiple time-series of digital numbers can be derived using other combinations of sampled and newly sampled digital numbers. For example, the multiple time-series of digital numbers can be derived from consecutive sequences of sampled image fields. That is, a set of X sampled image fields is used to form a first digital number and the next set of X sampled image fields is used to form a second digital number.

The frequency analysis is performed to separate the frequency spectrum of the time-series of digital numbers so that the presence or absence of a spectral peak at the flicker frequency band can be detected. As discussed above, the flicker frequency of a fluorescent light source occurs at twice the frequency of the AC power supply. Thus, the flicker frequency of a 50 Hz AC powered fluorescent light source occurs at 100 Hz which is referred to as the fundamental flicker frequency. If the imaging system is capable of sampling the scene at a sufficiently high frequency (greater than 200 Hz), it is possible to directly detect the fundamental flicker frequency at 100 Hz. However, the field rate (or sampling rate) of an NTSC video camera is only 60 Hz which prevents the direct detection of the fundamental flicker frequency of 100 Hz. In accordance with one embodiment of the present invention, instead of detecting the fundamental flicker frequency directly, the frequency analysis is performed to detect an alias of the fundamental flicker frequency where the alias is at a sufficiently low frequency to be adequately sampled by the sampling rate of the camera. In this manner, flicker detection can be performed without requiring high frequency sampling at the imaging system. The selection of a frequency alias of the fundamental flicker frequency for frequency analysis will be described in more detail below.

To improve accuracy of the frequency analysis, the flicker detection method of the present invention compares the spectral energy at the flicker frequency (either the fundamental or an alias) to the spectral energy at a frequency where flicker is not expected to occur (step 20). By performing the comparison, the method of the present invention ascertains that any spectral energy detected at the flicker frequency is caused by flicker, rather than by normal motion or changes in the video images. The frequency analysis can thus provide a more accurate indication of the presence of flicker. In the present embodiment, the ratio of the spectral energy at the flicker frequency and the spectral energy at a non-flicker frequency is obtained. The resultant power ratio of the two spectral energy values forms a flicker detect indicator (step 22) for the current time-series of digital numbers.

To ensure robust detection result, multiple flicker detect indicators for multiple time-series of digital numbers are obtained over time and aggregated (step 24). That is, steps 12 to 22 of method 10 are repeated to obtain multiple flicker detect indicators over a time period. The multiple flicker detect indicators are aggregated over time to generate a flicker present signal and/or a flicker absent signal (step 26). In practice, the aggregation step operates to low-pass filter the flicker detect indicator signals so as to reject rapid changes in the signals due to the flicker itself. The aggregation step effectively filters out high frequency components of the multiple flicker detect indicators, leaving the envelope of the signals. In this manner, a reliable flicker present signal can be generated.

When sufficient flicker detect indicators are aggregated, a determination of the flicker present signal can be made (step 26). In the present embodiment, a flicker absent signal is also generated to indicate the absence of flicker in the video images. Thus, the flicker present signal is asserted if the number of flicker detect indicators having values exceeding a first predetermined threshold level is greater than an entry time value. On the other hand, the flicker absent signal is asserted when the number of flicker detect indicators having values below a second predetermined threshold level is greater than an exit time value. The threshold levels and the entry/exit time values can be selected by the user and are usually selected to have values that are sufficiently large to allow reliable detection within a reasonable time period. In one embodiment, the threshold levels are selected so that the detection time is about 10 seconds. In the present embodiment, the generation of the flicker present signal and/or the flicker absent signal is a continuous process where the flicker detect indicators are continuously provided and aggregated and the states of the flicker present signal and/or flicker absent signal are continuously updated by comparison to the first and second threshold levels.

By performing frequency analysis over multiple series of digital numbers obtained from multiple sequences of sampled image fields and by aggregating flicker detect indicators derived from the frequency analysis, the flicker detection method of the present invention provides reliable detection of fluorescent flicker in video images. The flicker present/absent signal can be used by an imaging system in which the flicker detection method is incorporated to provide appropriate flicker compensation in subsequent video capture.

Frequency Alias of the Flicker Frequency

As described above, in an NTSC video camera, each image field is updated at 1/60 second (60 Hz frequency). Thus, the camera's sampling rate is 60 Hz and the sampling frequency is too low to sample the fundamental flicker frequency of 100 Hz directly. The Nyquist's theorem states that an analog signal waveform may be uniquely reconstructed, without error, from samples taken at equal time intervals if the sampling rate is equal to or greater than twice the highest frequency component in the analog signal. In other words, for a given sampling rate, the highest frequency in a signal that can be correctly detected is half the sampling rate. Half of the sampling frequency is often referred to as the Nyquist frequency.

Thus, at a sampling rate of 60 Hz, the highest frequency that can be detected is 30 Hz, far short of the fundamental flicker frequency of 100 Hz. Furthermore, in some cases, the video camera, even though operating under the 60 Hz sampling rate, may not generate a histogram for the luminance data at every image field. For example, in some cases, a histogram is generated only every other field. Thus, the sampling rate is reduced to 30 Hz and the Nyquist frequency is only 15 Hz. With the Nyquist frequency at either 30 Hz or 15 Hz, the 100 Hz fundamental flicker frequency cannot be detected directly.

In accordance with one embodiment of the present invention, the flicker frequency that may appear in the series of digital numbers is detected by detecting either the fundamental flicker frequency or a frequency alias of the fundamental flicker frequency. Under sampling theory, "foldover" occurs when frequencies that are more than the Nyquist frequency (half the sampling frequency) appear as frequencies that are less than the Nyquist frequency. Thus, a high frequency signal being under-sampled will have a frequency alias within the detectable frequency range, that is, below the Nyquist frequency. This frequency alias can be used to indicate the presence or absence of the under-sampled high frequency signal.

Figure 4:
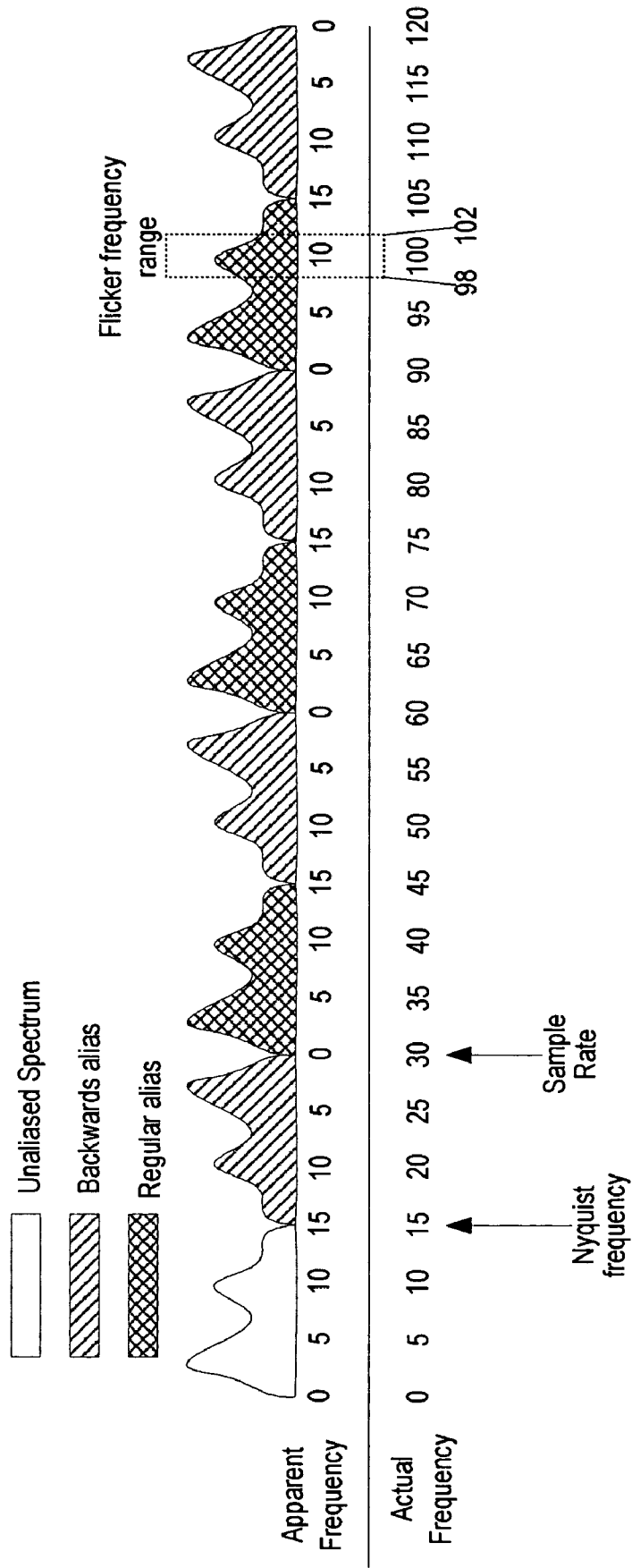
FIG. 4 is a frequency spectrum illustrating the frequency characteristics of a series of median values of the luminance data including the unaliased spectrum and the alias spectra.

In the present illustration, it is assumed that the video camera in which the flicker detection method is incorporated generates a histogram of the luminance data every other image field. Thus, the image fields are sampled at a 30 Hz frequency. The use of a frequency alias to detect the fundamental flicker frequency at 100 Hz when the sampling rate is 30 Hz will be described with reference to FIG. 4. FIG. 4 is a frequency spectrum illustrating the frequency characteristics of a series of median values of the luminance data (the digital numbers) including the unaliased spectrum and the alias spectra. When the sampling rate is 30 Hz, the Nyquist frequency is 15 Hz which is the highest frequency that a signal can be unaliasly detected. Thus, the unaliased frequency spectrum occurs from 0 to 15 Hz which is the frequency range for unalias frequency detection, referred herein as the detectable frequency range.

When a signal is sampled at 30 Hz, frequencies in the signal that is higher than the Nyquist frequency of 15 Hz appear as aliases in the detectable frequency range. In FIG. 4, backward alias and regular alias spectra are mapped for signal frequency from 15 to 120 Hz. As can be observed from FIG. 4, the fundamental flicker frequency at 100 Hz will appear as an alias frequency of 10 Hz when sampled at the 30 Hz sample rate. Thus, the spectral energy at the alias frequency of 10 Hz in the sampled signal can be used to indicate the presence of spectral energy at 100 Hz frequency.

Since the AC power supply can vary slightly about its intended frequency, the flicker frequency will also vary within a range of frequencies. To effectuate accurate detection, a range of alias frequencies needs to be detected to capture all the frequencies in which a flicker may appear. For example, if a 50 Hz AC power main varies from 49 Hz to 51 Hz, the flicker frequency will have a range of 98 to 102 Hz. The alias frequency range for 98 to 102 Hz at a sampling rate of 30 Hz is from 8 to 12 Hz. Thus, in the present illustration, an alias frequency band of 8 to 12 Hz is used to ensure proper detection of the flicker signal. No flicker should appear outside of this frequency range. In the present description, the "flicker frequency band" refers to a frequency range about the fundamental flicker frequency where flicker is expected to occur or a frequency range about a frequency alias of the fundamental flicker frequency.

When a flicker frequency band is compared against an absolute threshold to determine presence of spectral energy within the flicker frequency band, false positive result can occur as the spectral energy in the frequency band may come from a variety of sources other than flicker. For example, ordinary motion or changes in the scene being captured may result in the presence of spectral energy in the flicker frequency band. In accordance with the method of the present invention, the spectral energy at the flicker frequency band is compared against the spectral energy at a frequency band where no flicker is expected to occur. The frequency band where no flicker is expected to occur is referred herein as the "non-flicker frequency band." It is assumed that when no flicker is present in the sampled images, the frequency spectrum of the digital numbers (such as the median luminance values of the sampled image fields) should contain all frequency components in roughly equal amounts. Therefore, by using the spectral energy at the non-flicker frequency band as a reference and by performing a comparison of the spectral energy at the flicker frequency band to the spectral energy at the non-flicker frequency band, the flicker detection method of the present invention is able to accurately determine that the spectral energy present in the flicker frequency band was caused by fluorescent flicker and not ordinary motion and scene changes. Robust flicker detection is thus realized.

Flicker Detection Method

The detail implementation of one embodiment the flicker detection method of the present invention will now be described with reference to FIG. 3. One of ordinary skill in the art, upon being apprised of the present invention, would appreciate that the flicker detection method can be implemented in other manners without departing from the spirit of the present invention. In the present embodiment, flicker detection method 50 is implemented in software entirely. In other embodiments, the flicker detection method can be implemented in firmware or other suitable data processing means.

Figure 3:
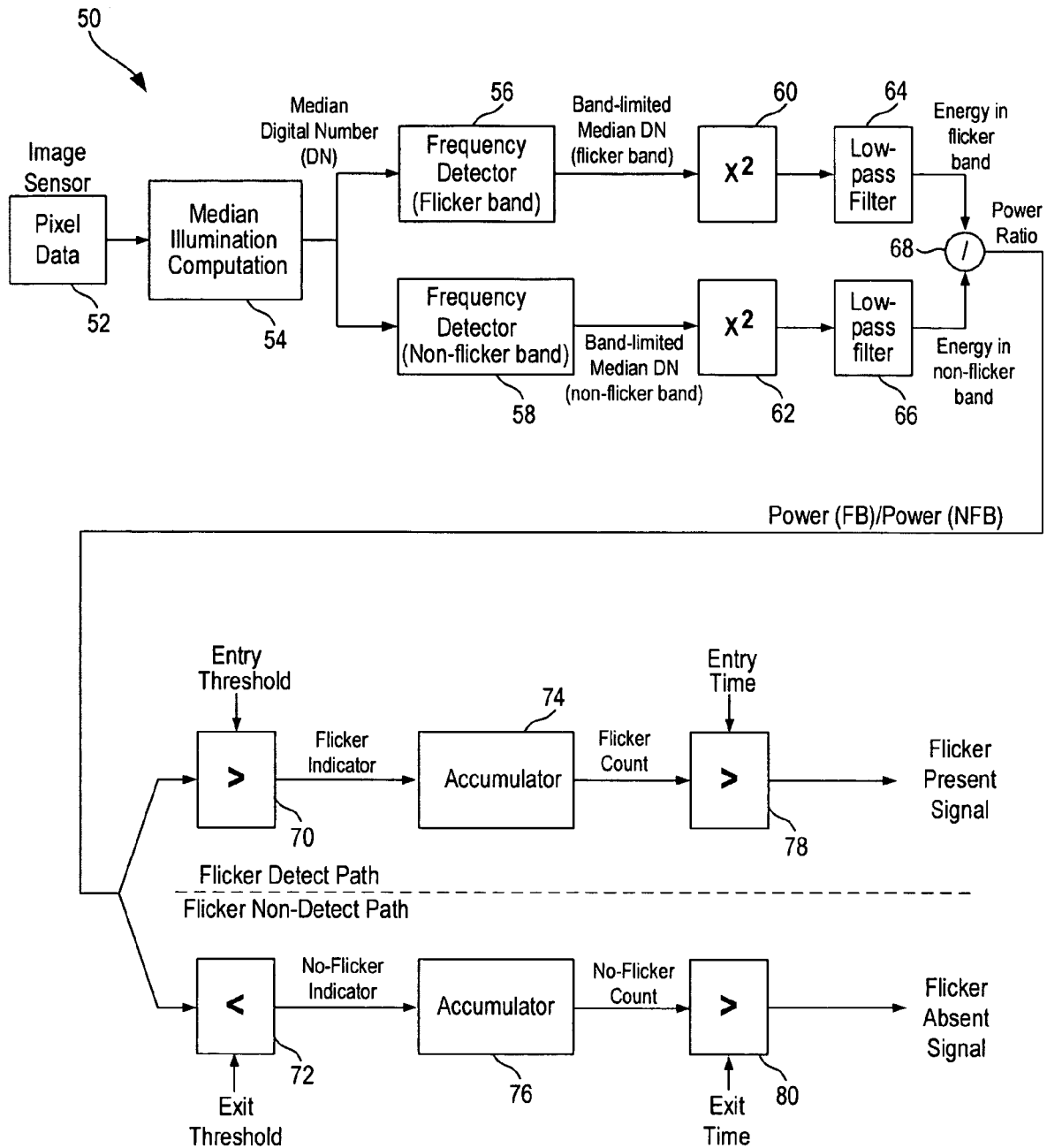
FIG. 3 is a detailed process flow diagram illustrating the flicker detection method according to one embodiment of the present invention.

FIG. 3 is a detailed process flow diagram illustrating the flicker detection method according to one embodiment of the present invention. Flicker detection method 50 of FIG. 3 can be implemented in a video camera for detecting the presence of fluorescent flicker in the captured video images and to provide a flicker present signal to allow the video camera to initiate proper flicker cancellation.

Referring to FIG. 3, flicker detection method 50 receives sampled image data (pixel data) from an image sensor 52. Each field of sampled image data is provided to a median illumination computation engine 54 for computing a median luminance value of the sampled image field as the digital number (DN). Median illumination computation engine 54 can receive image data for the entire image field or image data for just a region of the image field. In the present embodiment, the median luminance value is used as the digital number to characterize the sampled image field. As described above, in other embodiments, other arbitrary percentile luminance values can also be used as the digital number to characterize the sampled image field. In the present embodiment, median illumination computation engine 54 includes a histogram engine generating a histogram indicative of the number of pixels for each luminance value. The histogram data is analyzed to determine the median luminance value for the sampled image field. Median illumination computation engine 54 provides a digital number as the output signal for each sampled image field. In one embodiment, the histogram engine is implemented in hardware in the video camera while the median computation of the histogram data is implemented in software.

The sample frequency of the image data is determined by the field rate of the video camera and the rate at which median illumination computation engine 54 analyzes the image data. In the present embodiment, it is assumed that the field rate of the video camera is at the NTSC rate of 60 Hz and that median illumination computation engine 54 generates a histogram at every other image field received. Thus, the sample frequency in the present embodiment is 30 Hz.

Within a given time period, median illumination computation engine 54 continuously receives sampled image data from image sensor 52 and analyzes the sampled image fields at the sample frequency to provide a time-series of digital numbers as output signals.

Frequency Analysis

Having obtained a time-series of digital numbers, the digital numbers are analyzed to determine if flicker is present in the sampled image fields. A frequency analysis is performed to determine if there is more spectral energy in the flicker frequency band than the spectral energy in a non-flicker frequency band. To perform the frequency analysis, the time-series of digital numbers is converted into frequency information so that the spectral energy at the frequency bands of interest can be measured. In the present embodiment, the time-series of digital numbers is analyzed using digital filters whereby the frequency components of the digital numbers are split into different frequency bands of interest. Other methods for performing the frequency analysis can also be used, as will be described in more detail below.

Thus, in method 50 of FIG. 3, the time-series of digital numbers is coupled to a first frequency detector 56 and a second frequency detector 58. In the present embodiment, first frequency detector 56 is a digital filter for detecting frequency components of the digital numbers in the flicker frequency band. In the present embodiment, the flicker frequency band includes a frequency range of the alias frequencies of the fundamental flicker frequency range. The flicker frequency band is centered at 10 Hz with a 1 Hz wide frequency range on either side, providing a 3 dB attenuation. In the present embodiment, second frequency detector 58 is also a digital filter for detecting frequency components of the digital numbers in the non-flicker frequency band. In the present embodiment, the non-flicker frequency band is centered at 13.5 Hz with a 1 Hz wide frequency range on either side.

First frequency detector 56 provides a band-limited digital number at the flicker frequency band as an output signal while second frequency detector 58 provides a band-limited digital number at the non-flicker frequency band as an output signal. The output signals from the two frequency detectors are respectively squared (multipliers 60, 62) and low pass filtered (low pass filters 64, 66) to yield the energy signals (or power signals) associated with each of the frequency bands.

By the above frequency analysis, for each time-series of digital numbers, the energy in the flicker frequency band and the energy in the non-flicker frequency band are obtained. Method 50 determines the presence of flicker by comparing the energy at the flicker frequency band to the energy at the non-flicker frequency band where the energy at the no-flicker frequency band serves as the control value. If the energy at the flicker frequency band is consistently higher than the energy at the non-flicker frequency band, then method 50 can conclude that flicker is present in the video images.

Flicker detection method 50 operates to divide the energy at the flicker frequency band by the energy at the non-flicker frequency band using divider 68 to obtain a power ratio indicative of the magnitude of the spectral energy at the flicker frequency band as compared to the spectral energy at the non-flicker frequency band. In the present description, the power ratio is referred to as the flicker detect indicator. The power ratio will be close to one if no flicker is present in the video images since all frequency components are expected to be present in roughly equal amounts when there is no flicker. The power ratio will have a value greater than one and proportional to the amount of spectral energy present in the flicker frequency band.

Flicker Presence Determination

In flicker detection method 50, for each time-series of digital numbers being analyzed, a power ratio or a flicker detect indicator is generated. However, it is not practical to make a determination of the presence of flicker based on a single indicator result or even a small number of indicator results. This is because there is too much noise in the frequency spectrum to make a reliable determination with a single or a small number of indicator results. Thus, in accordance with the method of the present invention, the image data are continuously sampled and multiple time-series of digital numbers are continuously generated and analyzed to yield a series of the flicker detect indicators over a given time period. The flicker detect indicators over a time period are accumulated for making a final decision on the presence or absence of flicker in the video images. The sample time period is usually long enough to ensure reliable detection. For example, accumulating flicker detect indicators for 10 seconds or longer can be used.

In the present embodiment, flicker detection method 50 implements the indicator accumulation process by using two data paths to generate the final flicker decisions. Specifically, a flicker present signal and a flicker absent signal are generated respectively by each data path. This implementation is of course illustrative only and in other embodiments, a single data path may be sufficient to generate a single flicker present or absent signal for use by the video camera. However, the use of two data paths provides added advantages. Specifically, one criterion can be used for flicker detection for changing the video camera into a flicker-suppression state while another criterion can be used for detecting the absence of flicker when the camera is already in the flicker-suppression state.

In the first data path of method 50, the power ratio computed at divider 68, that is, the flicker detect indicator, is coupled to a comparator 70 for comparing to an entry threshold. If the power ratio is equal to or greater than the entry threshold, comparator 70 provides a logical "1" as the output signal. If the power ratio is less than the entry threshold, comparator 70 provides a logical "0" as the output signal. The entry threshold can be a user selected value. The entry threshold establishes the minimum amount the spectral energy in the flicker frequency band must be greater than the spectra energy in the non-flicker frequency band to be considered a reliable indicator of the presence of flicker.

The output of the entry threshold comparator is aggregated by an accumulator 74. Accumulator 74 provides a flicker count output that is initially reset to zero. When accumulator 74 receives a logical "1" value on its input, the flicker count is incremented by 1. When accumulator 74 receives a logical "0" value on its input, the flicker count is decremented by 1 with the count value clamped at zero. The flicker count is coupled to a comparator 78 to be compared with an entry time value. The entry time value is selected to establish the minimum samples required for a positive decision on the presence of flicker. When the flicker count is greater than the entry time value, the output of comparator 78—the flicker present signal—is asserted.

In the second data path of method 50, the power ratio computed at divider 68, that is, the flicker detect indicator, is coupled to a comparator 72 for comparing to an exit threshold. If the power ratio is equal to or less than the exit threshold, comparator 72 provides a logical "1" as the output signal. If the power ratio is greater than the exit threshold, comparator 72 provides a logical "0" as the output signal. The exit threshold can be a user selected value. The exit threshold establishes the maximum amount of the spectral energy in the flicker frequency band as compared to the spectral energy in the non-flicker frequency band where flicker is considered to be not present. If ratio of the spectral energy in the flicker frequency band as compared to the non-flicker frequency band is equal to or less than the exit threshold, no flicker is assumed to be present. By using an entry threshold that is different than the exit threshold, hysteresis between entering and exiting flicker compensation can be implemented so that the video camera does not keep switching back and forth between normal and flicker compensation modes when the ratio of the spectral energy is near one of the threshold levels.

The output of the exit threshold comparator is aggregated by an accumulator 76. Accumulator 76 provides a non-flicker count output that is initially reset to zero. When accumulator 76 receives a logical "1" value on its input, the non-flicker count is incremented by 1. When accumulator 76 receives a logical "0" value on its input, the non-flicker count is decremented by 1 with the count value clamped at zero. The non-flicker count is coupled to a comparator 80 to be compared with an exit time value. The exit time value is selected to establish the minimum samples required for a positive decision on the absence of flicker. When the non-flicker count is greater than the exit time, the output of comparator 80—the flicker absent signal—is asserted.

In this manner, flicker detection method 50 generates reliable the flicker present signal and the flicker absent signal. The flicker present signal and/or the flicker absent signal can be used by the video camera to initiate or discontinue flicker compensation. It is understood that the parallel data paths of method 50 will result in only one of the flicker present or flicker absent signals being heeded at a time.

Flicker Compensation

According to one aspect of the present invention, a video camera in which the flicker detection method of the present invention is incorporated provides flicker compensation based on the flicker detection result. Specifically, the camera includes two operational modes: (1) a normal mode where the camera operates under normal operating conditions for obtaining optimal image quality; and (2) a flicker compensation mode where the camera operates under modified operation conditions for flicker cancellation even if image quality is compromised. When the flicker present signal is asserted, the camera enters the flicker compensation mode of operation. When the flicker absent signal is asserted, the camera enters the normal mode.

In one embodiment, flicker compensation is provided by using an exposure time for each image capture that is an integer multiple of the time period of each fluorescent flicker cycle. By using an exposure time that is an integer multiple of the time period of each fluorescent flicker cycle, each exposure is ensured to collect substantially the same amount of light so that flickering of the video images is eliminated entirely.

Figure 5:
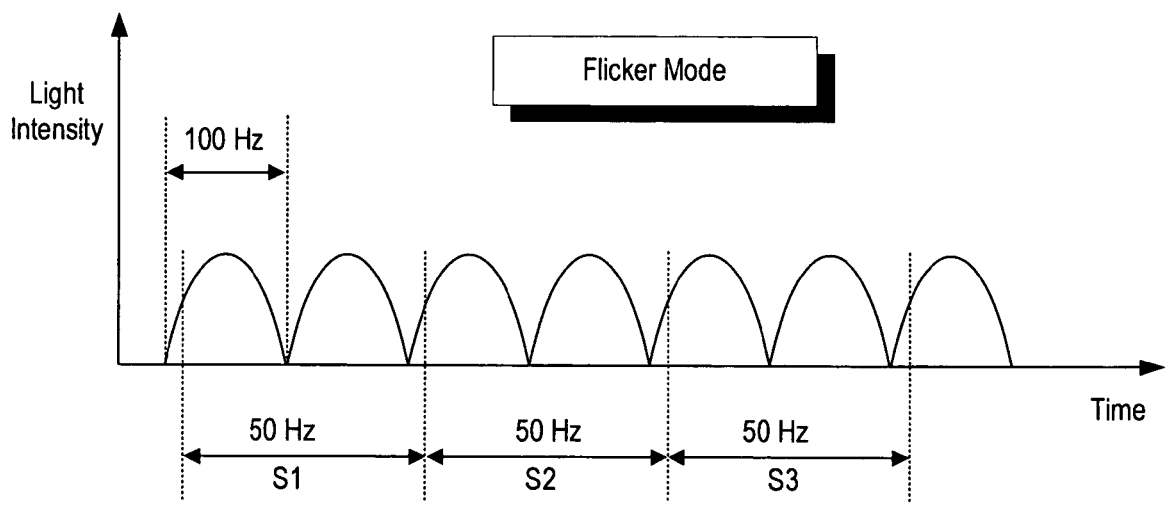
FIG. 5 illustrates the light intensity of a 50 Hz AC powered fluorescent light source plotted over time and the use of a 50 Hz exposure time for image capture.

For instance, when the fluorescent light is powered by a 50 Hz light source and therefore has a fluorescent flicker frequency of 100 Hz, each fluorescent flicker cycle has a time period of 10 ms. For flicker cancellation, a 20 ms exposure time, corresponding to 50 Hz, is used. FIG. 5 illustrates the light intensity of a 50 Hz AC powered fluorescent light source plotted over time and the use of a 50 Hz exposure time for image capture. When a 20 ms exposure time or 50 Hz sampling rate is used, each sample of the image consists of substantially the same amount of light. Therefore, flickering in the video image is eliminated. In the present illustration, a 20 ms exposure time is used to ensure sufficient light collection by the image sensing element as by nature of the fluorescent lighting, the scene is dimmer as compared to a scene illuminated by sun light.

According to another aspect of the present invention, flicker cancellation is provided so that a residual amount of flickering remains in the video images. Leaving a residual amount of flickering in the video images allows continuous detection of the presence or absence of flicker so that the video camera can determine whether it should remain in or exit from the flicker compensation mode.

In one embodiment, the exposure time in the flicker compensation mode is selected to be slightly lower or greater than an integer multiple of the fluorescent flicker cycle. For example, in the example given above, the exposure time can be set to 21 ms. Thus, a slight amount of flicker is left in the images to allow the flicker detection method to work to detect the presence of flicker. The residual flicker can be detected by the method of the present invention but is not visible to the human eyes. By leaving a residue amount of flicker in the video images, a wholly automatic flicker detection system is realized. The flicker detection method of the present invention can operate to detect the presence of flicker and to initiate flicker compensation mode for flicker cancellation. While in the flicker compensation mode, the flicker detection method can operate to detect the absence of flicker and to exit from the flicker compensation mode into the normal mode where the camera operates to capture images with optimal quality and resolution. In this manner, flicker cancellation is automatically initiated when needed and is automatically discontinued so as not to degrade image quality unnecessarily.

Alternately, flicker cancellation can be provided so that flickering is completely eliminated. In that case, the camera will have to be programmed to exit the flicker compensation mode periodically to detect if the scene is still illuminated by a flickering light source. The camera can be operated to enter flicker compensation mode automatically using the flicker detection method of the present invention but external means, such as a timer, must be provided to exit the flicker compensation mode.

Alternate Embodiments

In the above described embodiment, the frequency analysis of the time-series of digital numbers is performed by a pair of digital filters. Other methods for performing the frequency analysis may be used to detect the spectral energy in the flicker frequency band and the spectral energy in the non-flicker frequency band.

In one embodiment, instead of digital filters, the flicker detection method of the present invention uses Fourier analysis to analyze the time-series of digital numbers. Specifically, in one embodiment, Fourier analysis is performed with time divided into 1-second segments with 30 samples in each segment. The result of this Fourier analysis is that each term of the Fourier analysis has a 1 Hz bandwidth. A full Fourier analysis would produce 16 frequency bins of 1 Hz width at integer frequencies from 0-15 Hz. At every sampled image field, a digital number is collected and processed into each frequency bin. The processing for each digital number for each bin is to multiply the digital number by the sine and cosine of the frequency of the bin with the appropriate phase offset. The sine (in-phase) and cosine (quadrature) products are separately accumulated. At the end of the 1-second interval, the in-phase and quadrature terms for each frequency bin are squared and summed, giving the energy in each frequency band.

While the Fourier analysis approach has a number of benefits, especially in terms of small storage requirements, there are some limitations to using Fourier analysis in the flicker detection method of the present invention. Specifically, Fourier analysis is only exact for band-limited periodic signals. The luminance data, including the flicker, is neither band-limited nor periodic. The flicker is only periodic (in 1 Hz multiples) for certain precise frequencies. The non-periodic nature of the image data manifests itself as noise in the frequency bins besides the one where the signal ought to belong. Thus, signal-to-noise ratio obtained from a Fourier analysis is not generally optimal. Furthermore, when Fourier analysis is used, there may be latency as decisions can only be made at the rate at which a new analysis is completed, for example, 1 Hz. Using digital filters for frequency analysis has lower latency.

In another embodiment, the Goertzel algorithm can be used to perform the frequency analysis. The Goertzel algorithm is essentially the same as Fourier analysis, but is less computationally complex at the expense of slightly higher storage cost.

In yet another embodiment, frequency transforms can be used to produce the frequency-domain information that is required in order to detect the flicker frequency. For example, a Fast Fourier Transform (FFT) can be used. Frequency transforms may require significant data storage as compared to other frequency analysis approaches.

The above detailed descriptions are provided to illustrate specific embodiments of the present invention and are not intended to be limiting. Numerous modifications and variations within the scope of the present invention are possible. The present invention is defined by the appended claims.

We claim:

1. A method for detecting the presence of flicker in video images comprising:
   obtaining a set of luminance data from each sampled image field of the video images;
   analyzing the set of luminance data to obtain a digital number characterizing a brightness characteristic of the set of luminance data;
   compiling a time-series of digital numbers over multiple sets of luminance data of multiple sampled image fields;
   performing a frequency analysis on the time-series of digital numbers to provide a first signal indicative of frequency components of the time-series of digital numbers in a flicker frequency band and a second signal indicative of the frequency components of the time-series of digital numbers in a non-flicker frequency band;
   computing a first spectral energy signal and a second spectral energy signal based on the first signal and the second signal respectively;
   computing a ratio of the first spectral energy signal to the second spectral energy signal, the ratio being a flicker detect indicator signal;
   accumulating multiple flicker detect indicator signals from multiple time-series of digital numbers, the accumulated flicker detect indicator signals having values greater than a first threshold; and
   generating a flicker present signal when the number of accumulated flicker detect indicator signals is greater than an entry value.

2. The method of claim 1, wherein obtaining a set of luminance data from each sampled image field of the video images comprises obtaining luminance data for the entire image of each sampled image field of the video images.

3. The method of claim 1, wherein obtaining a set of luminance data from each sampled image field of the video images comprises obtaining luminance data from a region of each sampled image field of the video images.

4. The method of claim 1, wherein analyzing the set of luminance data to obtain a digital number characterizing the brightness characteristic of the set of luminance data comprises:
   determining the median luminance value of the set of luminance data; and
   assigning the median luminance value as the digital number.

5. The method of claim 4, wherein determining the median luminance value of the set of luminance data comprises:
   generating a histogram of the brightness values of the set of luminance data; and
   deriving the median luminance value from the histogram.

6. The method of claim 1, wherein analyzing the set of luminance data to obtain a digital number characterizing the brightness characteristic of the set of luminance data comprises:
   generating a histogram of the brightness values of the set of luminance data;
   selecting a percentile value for the set of luminance data;
   determining a percentile luminance value associated with the selected percentile value from the histogram; and
   assigning the percentile luminance value as the digital number.

7. The method of claim 6, wherein selecting a percentile value for the set of luminance data comprises selecting the median value, and wherein determining a percentile luminance value comprises determining the median luminance value of the set of luminance data from the histogram, the median luminance value being the digital number.

8. The method of claim 6, wherein the percentile value for the set of luminance data comprises a percentile value selected from the range of 25th percentile to 75 percentile.

9. The method of claim 1, wherein the flicker frequency band comprises a frequency range of frequencies where flicker in the video images is expected to occur and the non-flicker frequency band comprises a frequency range of frequencies where flicker in the video images is not expected to occur.

10. The method of claim 1, wherein each sampled image field of the video images is sampled at a sampling frequency and the flicker frequency band comprises a frequency range of alias frequencies corresponding to the range of fundamental flicker frequencies associated with the flicker in the video images, the frequency range of the alias frequencies being within a detectable frequency range determined by the sampling frequency of the video images.

11. The method of claim 10, wherein the detectable frequency range is one-half of the sampling frequency.

12. The method of claim 10, wherein the non-flicker frequency band comprises a frequency range of frequencies within the detectable frequency range where flicker in the video images is not expected to occur.

13. The method of claim 1, wherein performing frequency analysis on the time-series of digital numbers comprises:
   applying a first digital filtering function to the time-series of digital numbers, the first digital filtering function generating the first signal indicative of the frequency components of the time-series of digital numbers in the flicker frequency band; and
   applying a second digital filtering function to the time-series of digital numbers, the second digital filtering function generating the second signal indicative of the spectral energy of the time-series of digital numbers at the non-flicker frequency band.

14. The method of claim 1, wherein performing frequency analysis on the time-series of digital numbers comprises:
performing a first Fourier analysis on the time-series of digital numbers, the first Fourier analysis generating the first signal indicative of the frequency components of the time-series of digital numbers in the flicker frequency band; and
performing a second Fourier analysis on the time-series of digital numbers, the second Fourier analysis generating the second signal indicative of the frequency components of the time-series of digital numbers at the non-flicker frequency band.

15. The method of claim 1, wherein performing frequency analysis on the time-series of digital numbers comprises:
performing a frequency transform on the time-series of digital numbers, the frequency transform generating the first signal indicative of the frequency components of the time-series of digital numbers at the flicker frequency band and the second signal indicative of the spectral energy of the time-series of digital numbers in the non-flicker frequency band.

16. The method of claim 1, wherein computing a first spectral energy signal and a second spectral energy signal based on the first signal and the second signal respectively comprises:
computing a square of the first signal as the first spectral energy signal; and
computing a square of the second signal as the second spectral energy signal.

17. The method of claim 16, wherein computing a first spectral energy signal and a second spectral energy signal based on the first signal and the second signal respectively further comprises:
low pass filtering the square of the first signal as the first spectral energy signal; and
low pass filtering the square of the second signal as the second spectral energy signal.

18. The method of claim 1, wherein accumulating multiple flicker detect indicator signals and generating a flicker present signal comprise:
resetting a first count value;
comparing each flicker detect indicator signal to the first threshold;
incrementing the first count value when a flicker detect indicator is equal to or greater than the first threshold;
decrementing the first count value when a flicker detect indicator is less than the first threshold;
accumulating the first count value over multiple flicker detect indicator signals;
comparing the first count value to the entry value; and
generating a flicker present signal when the first count value is greater than the entry value.

19. The method of claim 1, further comprising:
accumulating multiple flicker detect indicator signals from multiple time-series of digital numbers, the accumulated flicker detect indicator signals having values smaller than a second threshold; and
generating a flicker absent signal when the number of accumulated flicker detect indicator signals having values smaller than a second threshold is greater than an exit value.

20. The method of claim 19, wherein accumulating multiple flicker detect indicator signals and generating a flicker absent signal comprise:
resetting a second count value;
comparing each flicker detect indicator signal to the second threshold;
incrementing the second count value when a flicker detect indicator is equal to or less than the second threshold;
decrementing the second count value when a flicker detect indicator is greater than the second threshold;
accumulating the second count value over multiple flicker detect indicator signals;
comparing the second count value to the exit value; and
generating a flicker absent signal when the second count value is greater than the exit value.

* * * * *

UNITED STATES PATENT AND TRADEMARK OFFICE
CERTIFICATE OF CORRECTION

PATENT NO. : 7,502,054 B2
APPLICATION NO. : 11/018662
DATED : March 10, 2009
INVENTOR(S) : Paul E. Kalapathy and Michael Franks It is certified that error appears in the above-identified patent and that said Letters Patent is hereby corrected as shown below:

Column 15, line 1, Claim 13: Cancel "spectral energy" and substitute --frequency components--.

Column 15, line 1, Claim 13: Cancel "at" and substitute --in--.

Column 15, line 13, Claim 14: Cancel "at" and substitute --in--.

Column 15, line 20, Claim 15: Cancel "at" and substitute --in--.

Column 15, line 21, Claim 15: Cancel "spectral" and substitute --frequency--.

Column 15, line 22, Claim 15: Cancel "energy" and substitute --components--.

Signed and Sealed this

Second Day of June, 2009

JOHN DOLL
*Acting Director of the United States Patent and Trademark Office*